United States Patent
Noma et al.

(10) Patent No.: US 9,604,331 B2
(45) Date of Patent: Mar. 28, 2017

(54) PROCESSING APPARATUS

(71) Applicants: F-TECH INC., Kuki, Saitama (JP); HONDA MOTOR CO., LTD., Tokyo (JP)

(72) Inventors: Naohiro Noma, Haga-gun (JP); Yukio Shoji, Kazo (JP); Tsutomu Kobayashi, Wako (JP); Mitsuru Sayama, Wako (JP)

(73) Assignees: F-TECH INC., Saitama (JP); HONDA MOTOR CO., LTD., Tokyo (JP)

( * ) Notice: Subject to any disclaimer, the term of this patent is extended or adjusted under 35 U.S.C. 154(b) by 764 days.

(21) Appl. No.: 14/019,610

(22) Filed: Sep. 6, 2013

(65) Prior Publication Data
US 2014/0080690 A1 Mar. 20, 2014

(30) Foreign Application Priority Data
Sep. 14, 2012 (JP) ................. 2012-202759

(51) Int. Cl.
*B23Q 3/157* (2006.01)
*B23K 20/12* (2006.01)
(Continued)

(52) U.S. Cl.
CPC ...... *B23Q 3/15706* (2013.01); *B23K 20/1245* (2013.01); *B23K 28/02* (2013.01);
(Continued)

(58) Field of Classification Search
CPC ............ B23Q 3/15506; B23Q 3/15566; B23Q 3/15706; Y10T 483/17; Y10T 483/1702;
(Continued)

(56) References Cited

U.S. PATENT DOCUMENTS 4,979,284 A * 12/1990 McMurtry ......... B23Q 3/15526
483/1
5,277,686 A * 1/1994 Enbergs .................. B23B 31/02
483/1
(Continued)

FOREIGN PATENT DOCUMENTS

JP 2006-116644 A 5/2006
JP 2007-007781 A 1/2007
JP 4699111 B2 6/2011

*Primary Examiner* — Erica E Cadugan
*Assistant Examiner* — Michael Vitale
(74) *Attorney, Agent, or Firm* — Westerman, Hattori, Daniels & Adrian, LLP

(57) ABSTRACT

A replacement device of a processing apparatus includes a gripping device having a single first support member positionally fixed, a first gripping portion provided on the first support member to grip a holder not to rotate in a releasing direction when the processing member is removed from the holder, and a second gripping portion provided on the first support member apart from the first gripping portion to grip the holder not to rotate in a restricting direction when the processing member is attached to the holder, and a holding device having a single movable second support member, plural first holding portions provided on the second support member to respectively accommodate the processing member removed from the holder, and plural second holding portions provided on the second support member apart from the first holding portions to respectively accommodate the processing member that is to be attached to the holder.

10 Claims, 5 Drawing Sheets

(51) Int. Cl.
  *B23Q 3/155*   (2006.01)
  *B23K 37/02*   (2006.01)
  *B23K 37/04*   (2006.01)
  *B23K 28/02*   (2014.01)
  *B23Q 16/06*   (2006.01)
  *B25J 11/00*   (2006.01)

(52) U.S. Cl.
  CPC ...... *B23K 37/0229* (2013.01); *B23K 37/0408* (2013.01); *B23Q 3/15506* (2013.01); *B23Q 3/15526* (2013.01); *B23Q 3/15722* (2016.11); *B23Q 16/06* (2013.01); *B25J 11/005* (2013.01); *Y10T 483/17* (2015.01); *Y10T 483/1793* (2015.01); *Y10T 483/1882* (2015.01)

(58) Field of Classification Search
  CPC ........... Y10T 483/1726; Y10T 483/179; Y10T 483/1793; Y10T 483/1795; Y10T 483/1798; Y10T 483/1882
  USPC ................ 483/16, 17, 27, 54, 55, 56, 57, 67
  See application file for complete search history.

(56) References Cited

U.S. PATENT DOCUMENTS

| | | | |
|---|---|---|---|
| 7,267,642 B2 | 9/2007 | Arai et al. | |
| 2002/0193217 A1* | 12/2002 | Yoshinaga | B23K 20/123 483/36 |
| 2004/0005973 A1* | 1/2004 | Momochi | B23Q 3/15553 483/1 |
| 2007/0004572 A1 | 1/2007 | Arai et al. | |

* cited by examiner

PROCESSING APPARATUS

BACKGROUND OF THE INVENTION

The present invention relates to a processing apparatus, and more particularly relates to a processing apparatus including a replacement device that can freely and automatically replace a processing member.

In recent years, in addition to general arc welding and the like, there has been proposed a friction stir welding apparatus that performs friction stir on a predetermined weld portion in a processing target component formed from a plurality of metal plates such as aluminum plates by using a probe rotating at a high speed, and that welds the metal plates to each other. A configuration including a weld portion welded by the friction stir welding apparatus has been realized even in strength components of a mobile object such as an automobile.

In such a friction stir welding apparatus, it is necessary to move the probe and the processing target component relatively to each other, and precisely weld the predetermined weld portion. Therefore, in a case where some material of the processing target component sticks onto and smears the probe or where the probe is worn down, it is desirable to realize a configuration in which the probe can be replaced simply. Furthermore, other processing apparatuses including a processing member such as a probe have the same circumstances as described above.

Under the circumstances, Japanese Patent Application Laid-open Publication No. 2006-116644 relates to an automatic perforating apparatus, and discloses a configuration in which a collet chuck 3 is provided at a distal end of a spindle 1, and an inner diameter of the collet chuck 3 is automatically increased or decreased, thereby replacing a rotary tool 8 in an unmanned manner.

Further, Japanese Patent Application Laid-open Publication No. 2007-7781 relates to an automatic tool exchanger, and discloses a configuration in which the automatic tool exchanger includes a tool chucking unit 41 and a tool unchucking unit 51 that are provided so as to be advanceable and retractable between a tool storage device 31 and a tool exchanging position P2, thereby exchanging tools to a spindle including a tool chucking mechanism 24.

SUMMARY OF THE INVENTION

However, according to the studies by the present inventors, Japanese Patent Application Laid-open Publication No. 2006-116644 has a configuration in which, in a state where any one of a plurality of holding notches 18 provided on a tool magazine 4 is advanced to a position immediately below the collet chuck 3, and where a spindle head 2 is lowered, a locking protruding portion 25 provided on an upper surface of the tool magazine 4 is engaged with a locking recessed portion 17 formed on a lower-end outer-peripheral surface of an outer cylinder 6 of the collet chuck 3, and in a state where the outer cylinder 6 is stopped from rotating, the spindle 1 is rotated to increase or decrease the inner diameter of the collet chuck 3. Therefore, it is necessary to precisely align the locking protruding portion 25 provided on the upper surface of the tool magazine 4 with the locking recessed portion 17 formed on the lower-end outer-peripheral surface of the outer cylinder 6 of the collet chuck 3 to engage them with each other. Accordingly, such a configuration is complicated. Furthermore, it is necessary to provide the locking protruding portion 25 for each of the holding notches 18 on the tool magazine 4. Therefore, such a configuration is more complicated. Accordingly, both of these configurations have a room for improvement.

Further, according to the studies by the present inventors, in Japanese Patent Application Laid-open Publication No. 2007-7781, at the time of a tool-unchucking operation, it is necessary to advance the tool unchucking unit 51 to the tool exchanging position P2 and also to move a spindle head 21 (a spindle 23) toward the tool unchucking unit 51, thereby holding the tool chucking mechanism 24 within a tool loosening mechanism 52 of the tool unchucking unit 51, and loosening the tool chucking mechanism 24 by the tool loosening mechanism 52. In contrast, at the time of a tool-chucking operation, after a designated tool T is moved from the tool storage device 31 and held within a tool fastening mechanism 42 of the tool chucking unit 41, it is necessary to advance the tool chucking unit 41 to the tool exchanging position P2, and also to move the spindle head 21 (the spindle 23) toward the tool chucking unit 41, thereby holding the tool chucking mechanism 24 within the tool fastening mechanism 42 of the tool chucking unit 41, and fastening the tool chucking mechanism 24 by the tool fastening mechanism 42. That is, in this configuration, many movable members are used, and high-precision alignment is required for these individual members. Therefore, such a configuration is complicated, and accordingly has a room for improvement.

Therefore, a processing apparatus is currently expected which includes a replacement device that can freely and automatically replace a plurality of processing members continuously in a manner of high-precision alignment between constituent components with a simple configuration in which the number of components is reduced.

The present invention has been achieved to solve the above problems, and an object of the present invention is to provide a processing apparatus including a replacement device that can freely and automatically replace a plurality of processing members continuously in a manner of high-precision alignment between constituent components with a simple configuration in which the number of components is reduced.

To achieve the above object, a first aspect of the present invention is to provide a processing apparatus comprising: a processing tool that includes a drive mechanism, a processing member that is vertically movable to a processing-target member and rotatable to the processing-target member by utilizing a driving force of the drive mechanism, and a holder that detachably holds the processing member through a restricting portion; a moving mechanism that includes an arm to which the processing tool is attached, and that can freely move the processing tool to the processing-target member by moving the arm; and a replacement device that can freely replace the processing member, wherein the replacement device has: a gripping device that includes a single first support member in which a position thereof is fixed, a first gripping portion that is provided on the first support member, and can freely grip the holder not to rotate in a releasing direction when the processing member is removed from the holder, and a second gripping portion that is provided on the first support member apart from the first gripping portion, and can freely grip the holder not to rotate in a restricting direction when the processing member is attached to the holder; and a holding device that includes a single movable second support member, a plurality of first holding portions that are provided on the second support member, and can freely and respectively accommodate the processing member removed from the holder, and a plurality of second holding portions that are provided on the second support member apart from the first holding portions, and can freely and respectively accommodate the processing member to be attached to the holder, and wherein when the processing member is detached from the holder to replace the processing member, the second support member of the holding device is moved, thereby positioning the first support member of the gripping device to extend across both a corresponding one of the first holding portions and a corresponding one of the second holding portions, arranging the corresponding one of the first holding portions vertically below the first gripping portion, and arranging the corresponding one of the second holding portions vertically below the second gripping portion.

According to a second aspect of the present invention, in addition to the first aspect, the first gripping portion and the second gripping portion of the gripping device, and the processing-target member placed on a placement member are disposed within a movable range of the processing tool, which is defined by movement of the arm by the moving mechanism.

According to a third aspect of the present invention, in addition to the first or second aspect, the processing apparatus is a friction stir welding apparatus, and the restricting direction is a rotation direction of the friction stir welding apparatus at a time of friction stir welding.

According to a fourth aspect of the present invention, in addition to any of the first to third aspects, the second support member of the holding device is rotatable about a center axis thereof and is disk-shaped, the first holding portions are disposed on a first circumference to form a first circular line, the second holding portions are disposed on a second circumference to form a second circular line, and when the processing member is detached from the holder to replace the processing member, the second support member is rotated in a state where the first line is positioned vertically below the first gripping portion, and where the second line is positioned vertically below the second gripping portion, thereby feeding each of the first holding portions successively to be positioned vertically below the first gripping portion, and feeding each of the second holding portions successively to be positioned vertically below the second gripping portion.

According to a fifth aspect of the present invention, in addition to the fourth aspect, a straight line, connecting the first gripping portion and the second gripping portion, is displaced not to pass through a center axis of the second support member.

According to a sixth aspect of the present invention, in addition to any of the first to fifth aspects, each of the first gripping portion and the second gripping portion grips the holder according to an operation of a ratchet.

According to a seventh aspect of the present invention, in addition to any of the first to sixth aspects, the gripping device is elastically supported.

According to an eighth aspect of the present invention, in addition to any of the first to seventh aspects, the processing apparatus further comprises a pressing device that presses at least one of the processing member when the processing member is released from the holder and the processing member when the processing member is attached to the holder.

According to a ninth aspect of the present invention, in addition to any of the first to eighth aspects, the moving mechanism is an industrial robot.

According to the first aspect of the present invention, the replacement device of the processing apparatus includes the gripping device that includes the single first support member in which the position thereof is fixed, the first gripping portion that is provided on the first support member, and can freely grip the holder not to rotate in the releasing direction when the processing member is removed from the holder, and the second gripping portion that is provided on the first support member apart from the first gripping portion, and can freely grip the holder not to rotate in the restricting direction when the processing member is attached to the holder, and the holding device that includes the single movable second support member, the first holding portions that are provided on the second support member, and can freely and respectively accommodate the processing member removed from the holder, and the second holding portions that are provided on the second support member apart from the first holding portions, and can freely and respectively accommodate the processing member to be attached to the holder, wherein when the processing member is detached from the holder to replace the processing member, the second support member of the holding device is moved, thereby positioning the first support member of the gripping device to extend across both the corresponding one of the first holding portions and the corresponding one of the second holding portions, arranging the corresponding one of the first holding portions vertically below the first gripping portion, and arranging the corresponding one of the second holding portions vertically below the second gripping portion. Therefore, in a state where the processing member attached to the holder, the first gripping portion, and the corresponding one of the first holding portions are aligned vertically downward in this order, and where the holder having the processing member attached thereto is gripped by the first gripping portion not to rotate, the restricting portion is rotated in the releasing direction, thereby releasing the processing member from the holder, and accommodating the processing member in the corresponding one of the first holding portions. Thereafter, in a state where the holder to which the processing member is not attached, the second gripping portion, and the corresponding one of the second holding portions are aligned vertically downward in this order without moving the support member of the gripping portion, and where the holder to which the processing member is not attached is gripped by the second gripping portion not to rotate, and the processing member held in the corresponding one of the second holding portions is connected to the restricting portion, the restricting portion is rotated in the restricting direction opposite to the releasing direction, thereby attaching the processing member to the holder. Accordingly, the processing members can automatically be replaced continuously in a manner of high-precision alignment between constituent components with a simple configuration in which the number of components is reduced.

According to the second aspect of the present invention, the first gripping portion and the second gripping portion of the gripping device, and the processing-target member placed on the placement member are disposed within the movable range of the processing tool, which is defined by movement of the arm by the moving mechanism. Therefore, the overall configuration of the processing apparatus can be kept compact, and also the processing member that requires replacement can automatically be replaced immediately in a manner of high-precision alignment between constituent components with a simple configuration in which the number of components is reduced.

According to the third aspect of the present invention, the processing apparatus is the friction stir welding apparatus, and the restricting direction is the rotation direction of the friction stir welding apparatus at the time of friction stir welding. Therefore, even when the processing apparatus is the friction stir welding apparatus to be used at a high rotation speed with a high pressure force, the processing members can automatically be replaced continuously in a manner of high-precision alignment between constituent components with a simple configuration in which the number of components is reduced, while realizing high reliability in which the processing member does not come off, for example, at the time of friction stir welding.

According to the fourth aspect of the present invention, the second support member of the holding device is rotatable about the center axis thereof and is disk-shaped, the first holding portions are disposed on the first circumference to form the first circular line, the second holding portions are disposed on the second circumference to form the second circular line, and when the processing member is detached from the holder to replace the processing member, the second support member is rotated in a state where the first line is positioned vertically below the first gripping portion, and where the second line is positioned vertically below the second gripping portion, thereby feeding each of the first holding portions successively to be positioned vertically below the first gripping portion, and feeding each of the second holding portions successively to be positioned vertically below the second gripping portion. Therefore, while the configuration of the replacement device is made compact, the processing members can automatically be replaced continuously in a manner of high-precision alignment between constituent components with a simple configuration in which the number of components is reduced.

According to the fifth aspect of the present invention, the straight line, connecting the first gripping portion and the second gripping portion, is displaced not to pass through the center axis of the second support member. Therefore, the number of the first holding holes to be disposed and the number of the second holding holes to be disposed can be respectively increased, and the number of the processing members to be continuously replaced can be increased.

According to the sixth aspect of the present invention, each of the first gripping portion and the second gripping portion grips the holder according to an operation of the ratchet. Therefore, the holder can be reliably gripped with a simple configuration, and the processing members can automatically be replaced continuously in a manner of high-precision alignment between constituent components with a simple configuration in which the number of components is reduced.

According to the seventh aspect of the present invention, the gripping device is elastically supported. Therefore, while a positional tolerance between the holder and the first and second gripping portions is absorbed, the occurrence of misalignment or the like between them, caused by an unwanted impact on them, can be reduced.

According to the eighth aspect of the present invention, the processing apparatus further includes the pressing device that presses at least one of the processing member when the processing member is released from the holder and the processing member when the processing member is attached to the holder. Therefore, the pressing member presses the processing member when the processing member is released from the holder, and can encourage detachment of the processing member from the holder. Also the pressing member presses the processing member when the processing member is attached to the holder, and can encourage insertion of the processing member into the restricting portion within the holder.

According to the ninth aspect of the present invention, the moving mechanism is the industrial robot. Therefore, the processing members can automatically be replaced continuously in a manner of high-precision alignment between constituent components with a more general and simple configuration in which the number of components is reduced.

DETAILED DESCRIPTION OF THE PREFERRED EMBODIMENT

Figure 1:
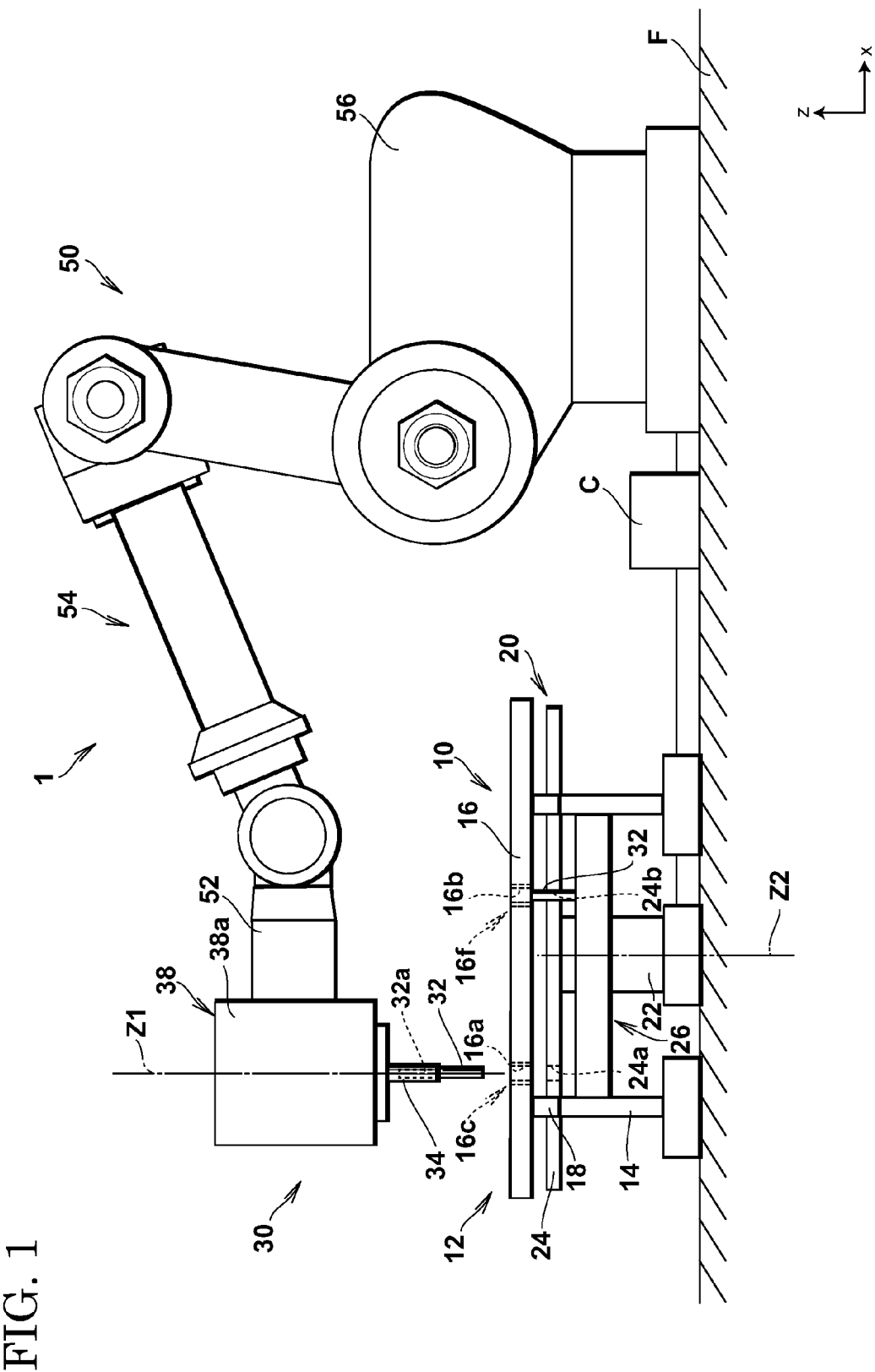
FIG. 1 is a side view of an overall configuration of a friction stir welding apparatus according to an embodiment of the present invention.

A processing apparatus according to an embodiment of the present invention is explained in detail below with reference to the accompanying drawings while exemplifying a friction stir welding apparatus. In the drawings, an x-axis, a y-axis, and a z-axis constitute a three-axis orthogonal coordinate system. A plane defined by the x-axis and the y-axis is parallel to a horizontal plane. The direction of the z-axis is a vertical direction, and the positive direction of the z-axis is a vertically upward direction. The processing apparatus of the present invention is also applicable to processing apparatuses including a rotatable processing member that performs mechanical processing such as cutting, drilling, and grinding, in addition to the friction stir welding apparatus explained in the present embodiment.

Figure 2:
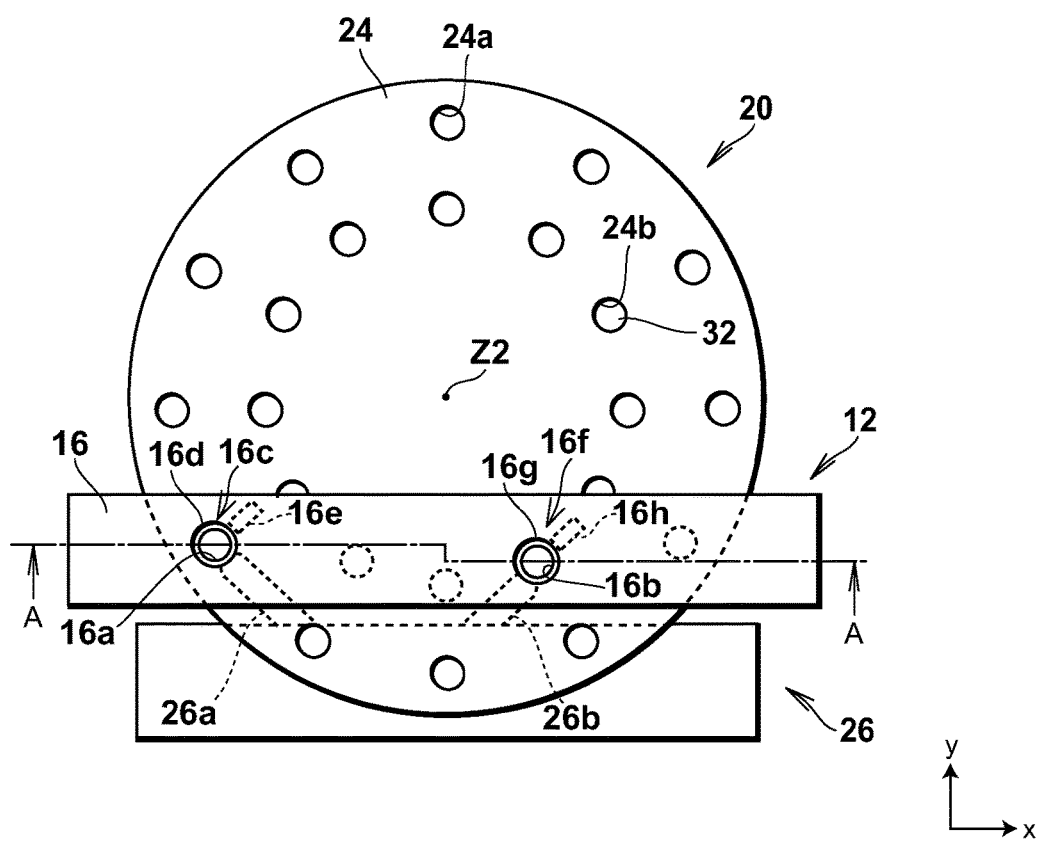
FIG. 2 is a top view of a replacement device in the friction stir welding apparatus according to the embodiment.
Figure 3:
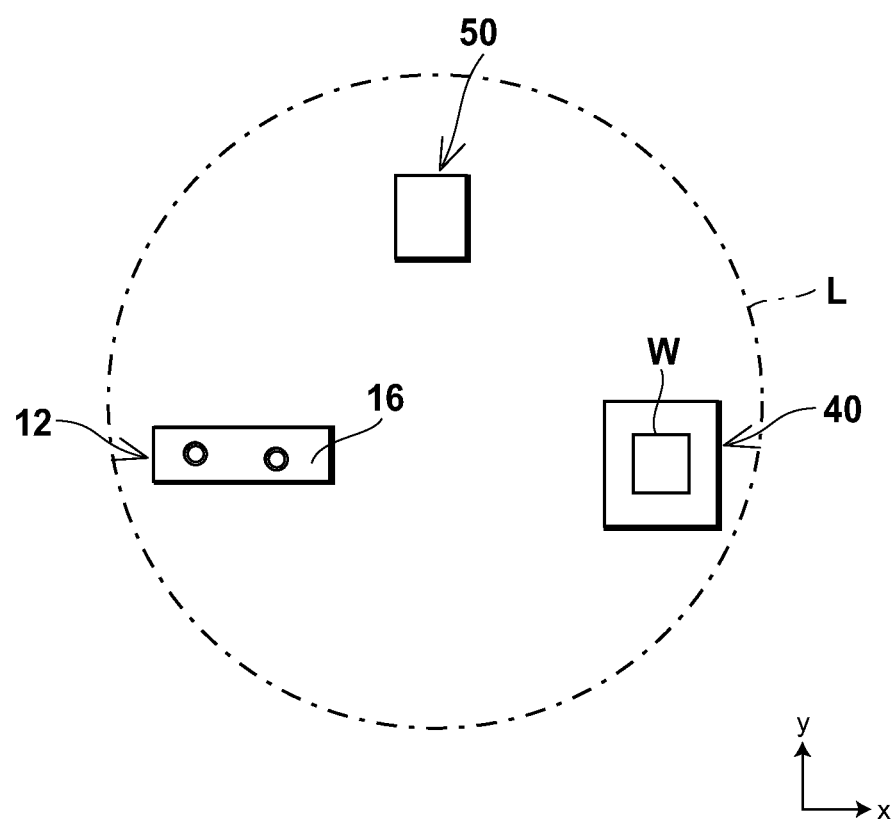
FIG. 3 is a schematic top view showing a range where the replacement device in the friction stir welding apparatus according to the embodiment is disposed.

FIG. 1 is a side view of an overall configuration of the friction stir welding apparatus according to the present embodiment. FIG. 2 is a top view of a replacement device in the friction stir welding apparatus according to the present embodiment. FIG. 3 is a schematic top view showing a range where the replacement device in the friction stir welding apparatus according to the present embodiment is disposed.

As shown in FIGS. 1 to 3, a friction stir welding apparatus 1 includes a replacement device 10 that is fixedly provided on a floor F, a welding tool 30 that can be freely arranged above and opposite to the replacement device 10, and a robot 50 that is fixedly provided on the floor F and holds the welding tool 30 by an attachment jig 52.

Specifically, the replacement device 10 includes a gripping device 12 and a holding device 20. The gripping device 12 is disposed above the holding device 20.

The gripping device 12 includes support legs 14 that are fixedly provided on the floor F, and a support plate 16 that is fixedly provided on the support legs 14. On the support plate 16, gripping holes 16a and 16b are provided, each of which passes through an upper surface and a lower surface of the support plate 16. A ratchet 16c is disposed for the gripping hole 16a, and a ratchet 16f is disposed for the gripping hole 16b. The support plate 16 is typically made of metal such as steel. However, the support plate 16 is not limited to having a plate shape, and can have other shapes, as long as the support plate 16 has necessary and sufficient strength and rigidity.

Specifically, the ratchet 16c includes a rotary member 16d that is rotatable only in a clockwise direction on the x-y plane as viewed in the negative direction of the z-axis (hereinafter, "clockwise direction"), and that includes the gripping hole 16a as its inner peripheral hole, and a locking member 16e that can freely lock the rotary member 16d. That is, when the rotary member 16d is to rotate in the clockwise direction, the locking member 16e does not lock the rotary member 16d including the gripping hole 16a, and allows them to rotate. In contrast, when the rotary member 16d is to rotate in a counterclockwise direction on the x-y plane as viewed in the negative direction of the z-axis (hereinafter, "counterclockwise direction"), the locking member 16e locks the rotary member 16d including the gripping hole 16a, thereby prohibiting them from rotating.

The ratchet 16f includes a rotary member 16g that is rotatable only in the counterclockwise direction, and that includes the gripping hole 16b as its inner peripheral hole, and a locking member 16h that can freely lock the rotary member 16g. That is, when the rotary member 16g is to rotate in the counterclockwise direction, the locking member 16h does not lock the rotary member 16g including the gripping hole 16b, and allows them to rotate. In contrast, when the rotary member 16g is to rotate in the clockwise direction, the locking member 16h locks the rotary member 16g including the gripping hole 16b, thereby prohibiting them from rotating.

In the gripping device 12, it is preferable to dispose an elastic member 18 between the support legs 14 and the support plate 16. In such a case, the support plate 16 is elastically supported by the support legs 14. The elastic member 18 can be formed of a rubber member, or can be formed of a spring member and a damper member.

The holding device 20 includes a shaft member 22 that is fixedly provided on the floor F, and a disk-shaped support plate 24 that is supported on the shaft member 22 to be rotatable about a center axis Z2 parallel to the z-axis by the driving of a motor or the like (not shown). On the support plate 24, a plurality of holding holes 24a and 24b are provided, each of which passes through an upper surface and a lower surface of the support plate 24. The support plate 24 is typically made of metal, such as steel. However, the support plate 24 is not limited to having a plate shape, and can have other shapes, as long as the support plate 24 has necessary and sufficient strength and rigidity.

Specifically, the holding holes 24a are disposed in a circular line at equal spacing on the outer peripheral side of the support plate 24 on a circumference parallel to the outer periphery of the support plate 24. This circular line is arranged immediately vertically below the gripping hole 16a. When the support plate 24 is rotated about the center axis Z2, each of the holding holes 24a is fed to be successively positioned immediately vertically below the gripping hole 16a of the gripping device 12.

Furthermore, the holding holes 24b are disposed in a circular line at equal spacing on the inner peripheral side of the support plate 24 on a circumference parallel to the outer periphery of the support plate 24. This circular line is arranged immediately vertically below the gripping hole 16b. When the support plate 24 is rotated about the center axis Z2, each of the holding holes 24b is fed to be successively positioned immediately vertically below the gripping hole 16b of the gripping device 12.

The support plate 16 of the gripping device 12 is positioned to extend across and vertically above the circular line formed by the holding holes 24a and the circular line formed by the holding holes 24b.

It is preferable to provide a straight line, connecting the center of the gripping hole 16a and the center of the griping hole 16b, to be displaced from the radial direction of the support plate 24 in order not to pass through the center axis Z2 of the support plate 24. The reason for this is as follows. In a case where the straight line, connecting the center of the gripping hole 16a and the center of the gripping hole 16b, passes through the center axis Z2 of the support plate 24, the gripping hole 16a and the gripping hole 16b are arranged in the radial direction of the support plate 24. Therefore, it is necessary to also arrange the holding hole 24a and the holding hole 24b in the radial direction of the support plate 24. However, when the straight line, connecting the center of the gripping hole 16a and the center of the gripping hole 16b, is provided to be displaced from the radial direction of the support plate 24 in order not to pass through the center axis Z2 of the support plate 24, it is not necessary to arrange the holding hole 24a and the holding hole 24b in the radial direction of the support plate 24. Therefore, the line formed by the holding holes 24a and the line formed by the holding holes 24b are provided close to each other in the radial direction of the support plate 24 by, for example, arranging one holding hole 24b between two holding holes 24a, and both the holding holes 24a and the holding holes 24b can be provided on an outer peripheral-end side of the support plate 24 in a concentrated manner. As a result, the number of the holding holes 24a to be disposed and the number of the holding holes 24b to be disposed can be respectively increased, and the number of probes 32 to be continuously replaced can be increased.

From the viewpoint of the simplicity of making the configuration of the holding device 20 compact, the shape of the support plate 24 is preferably a disk shape. However, the shape of the support plate 24 is not limited to a disk shape, and can be a rectangular plate shape, for example. In a case where the support plate 24 has a rectangular plate shape, the holding holes 24a and the holding holes 24b are respectively disposed at equal spacing to form lines parallel to each other. In such a case, the support plate 24 is moved in a direction parallel to the horizontal plane by the driving of the motor or the like, and each of the holding holes 24a is fed to be successively positioned immediately vertically below the gripping hole 16a of the gripping device 12, and also each of the holding holes 24b is fed to be successively positioned immediately vertically below the gripping hole 16b of the gripping device 12.

In the drawings, each of the holding holes 24a and 24b is shown in a mode of a through hole. However, each of them can be a recessed bottomed hole with its lower end closed. By providing a flange (not shown) on the probe 32, and setting the flange to be locked by an upper-end peripheral portion of each of the holding holes 24a and 24b, the probe 32 can be reliably held even when each of the holding holes 24a and 24b is a through hole.

Preferably, the replacement device 10 further includes a pressing device 26. The pressing device 26 is fixed relative to the floor F by, for example, fixedly providing the pressing device 26 between the support legs 14 of the gripping device 12, and includes pressing members 26a and 26b, each of which is advanceable and retractable. The pressing device 26 does not necessarily include both the pressing members 26a and 26b, and can include either one of them.

The welding tool 30 that is a processing tool is typically a cylindrical member made of metal, such as iron and extending in the vertical direction. The welding tool 30 includes the probe 32 that is rotatable about a center axis Z1 parallel to the z-axis and is vertically movable, and that serves as a processing member, a holder 34 that holds the probe 32, and a drive mechanism 33 that vertically moves the probe 32 held by the holder 34, and that rotates the probe 32 about the center axis Z1.

The probe 32 is attached to the holder 34 through a restricting portion 32a that is coupled with a driving force of the drive mechanism 38. At the time of a normal operation of the friction stir welding apparatus 1 that performs friction stir welding, the probe 32 is vertically movable and rotatable with the holder 34 and the restricting portion 32a. In contrast, at the time of replacing the probe 32, the probe 32 is rotatable relative to the holder 34 through the restricting portion 32a.

That is, at the time of the normal operation of the friction stir welding apparatus 1 that performs friction stir welding, the holder 34 and the restricting portion 32a do not rotate relative to each other, and a driving force of the drive mechanism 38 is transmitted to the probe 32 through the restricting portion 32a. The probe 32 rotates in the clockwise direction at the time of friction stir welding. In contrast, at the time of replacing the probe 32, the holder 34 and the restricting portion 32a rotate relative to each other. Therefore, according to the direction of their relative rotations, the probe 32 is fastened to/loosened from the restricting portion 32a, and is attached to/detached from the holder 34. The restricting portion 32a typically has a chuck structure such as a collet chuck structure. The drive mechanism 38 has a motor, a shaft, and the like (all not shown) incorporated in its casing 38a.

The diameter of the gripping hole 16a of the gripping device 12 is set to provide a predetermined fastening margin relative to the diameter of the holder 34. When the holder 34 is inserted into the gripping hole 16a, the holder 34 is gripped by the gripping hole 16a without slipping through.

Therefore, when the holder 34 with the probe 32 attached is inserted into the gripping hole 16a, and is to rotate in the clockwise direction, and accordingly the rotary member 16d is to rotate in the clockwise direction, the locking member 16e does not lock the rotary member 16d. Consequently, the gripping hole 16a that is the inner peripheral hole of the rotary member 16d is not locked, and is allowed to rotate, and thus the holder 34 is rotatable in the clockwise direction with the probe 32 and the restricting portion 32a. In contrast, when the holder 34 with the probe 32 attached is to rotate in the counterclockwise direction, and accordingly the rotary member 16d is to rotate in the counterclockwise direction, the locking member 16e locks the rotary member 16d. Consequently, the gripping hole 16a that is the inner peripheral hole of the rotary member 16d is locked, and is prohibited from rotating, and thus the holder 34 cannot rotate in the counterclockwise direction with the probe 32 and the restricting portion 32a. As a result, relative rotations are generated between the holder 34, and the probe 32 and the restricting portion 32a, and the probe 32 weakens the restricted state between the probe 32 and the restricting portion 32a, while rotating in the counterclockwise direction with the restricting portion 32a.

Furthermore, when the holder 34 with the probe 32 not attached is inserted into the gripping hole 16b, and is to rotate in the counterclockwise direction, and accordingly the rotary member 16g is to rotate in the counterclockwise direction, the locking member 16h does not lock the rotary member 16g. Consequently, the gripping hole 16b that is the inner peripheral hole of the rotary member 16g is not locked, and is allowed to rotate, and thus the holder 34 is rotatable in the counterclockwise direction. In contrast, when the holder 34 with the probe 32 not attached is to rotate in the clockwise direction, and accordingly the rotary member 16g is to rotate in the clockwise direction, the locking member 16h locks the rotary member 16g. Consequently, the gripping hole 16b that is the inner peripheral hole of the rotary member 16g is locked, and is prohibited from rotating, and thus the holder 34 cannot rotate in the clockwise direction. As a result, relative rotations are generated between the holder 34 and the restricting portion 32a, and the probe 32, to be accommodated in and connected to the restricting portion 32a, strengthens the restricted state between the probe 32 and the restricting portion 32a.

At the time of replacing the probe 32, the support plate 24 of the holding device 20 is rotated about the center axis Z2, and therefore the support plate 16 of the gripping device 12 is positioned to extend across and vertically above a corresponding one of the holding holes 24a and a corresponding one of the holding holes 24b. As a result, the corresponding one of the holding holes 24a is positioned immediately vertically below the gripping hole 16a, and also the corresponding one of the gripping holes 24b is positioned immediately vertically below the gripping hole 16b.

The robot 50 is a moving mechanism that can freely move the welding tool 30, and is typically an industrial robot. Specifically, the robot 50 includes the attachment jig 52 that attaches the welding tool 30 thereto, an arm 54 that is typically a multijoint manipulator and has the attachment jig 52 attached thereto, and a robot body 56 that has a drive mechanism that moves the arm 54, a computing processing device, a memory, and the like (all not shown) incorporated therein. The casing 38a of the drive mechanism 38 of the welding tool 30 is attached and fixed to the attachment jig 52.

As shown in FIG. 3, the gripping holes 16a and 16b of the gripping device 12, and a processing-target member W placed on a placement table 40 are arranged within a movable range L defined by the movement of the arm 54 of the robot 50 and showing a limited range where the probe 32 and the holder 34 of the welding tool 30 can be positioned.

Various corresponding constituent elements in the friction stir welding apparatus 1 receive a control signal transmitted from a controller C, and are appropriately controlled, and also operate to perform friction stir welding on the processing-target member W, while automatically replacing the probe 32 as necessary. The controller C has a computing processing device, a memory, and the like (all not shown) incorporated therein. In the memory, a control program for replacing the probe 32 and performing friction stir welding, data regarding a predetermined processing direction, and the like are stored.

Next, in the friction stir welding apparatus 1 having the above configuration, a replacement operation for automatically replacing the probe 32 is explained below in detail also with reference to FIGS. 4 and 5.

Figure 4A:
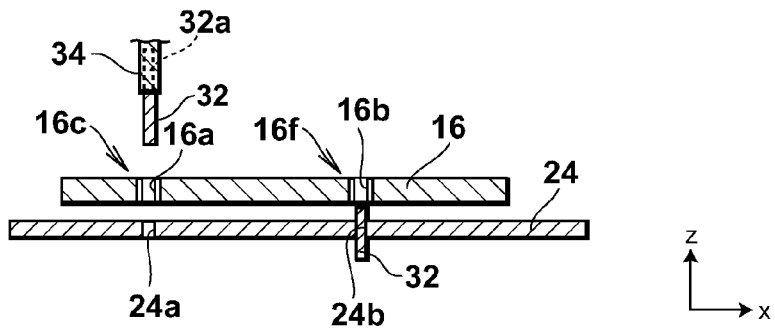
FIGS. 4A to 4C are process diagrams showing an operation of the replacement device in the friction stir welding apparatus according to the embodiment.
Figure 4B:
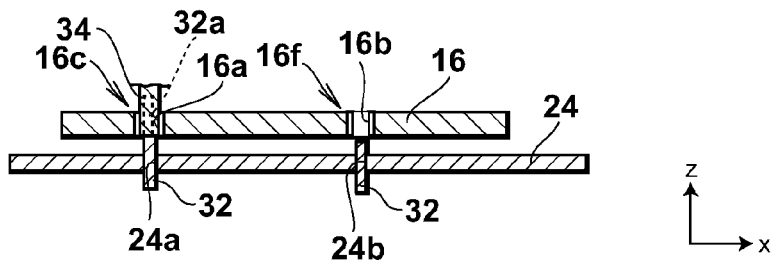
Figure 4C:
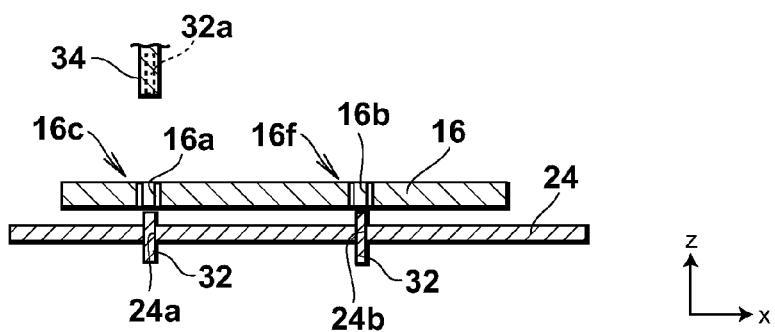
Figure 5A:
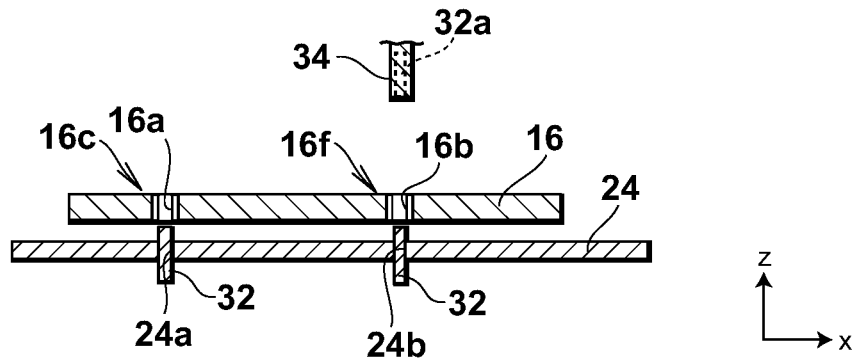
FIGS. 5A to 5C are process diagrams showing an operation of the replacement device in the friction stir welding apparatus according to the embodiment, and show steps subsequent to those shown in FIGS. 4A to 4C.
Figure 5B:
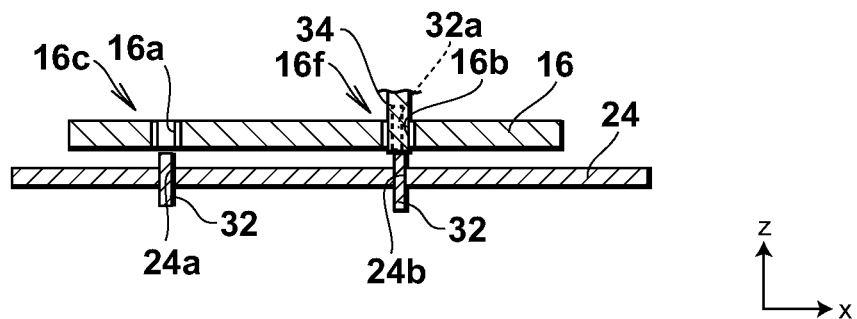
Figure 5C:
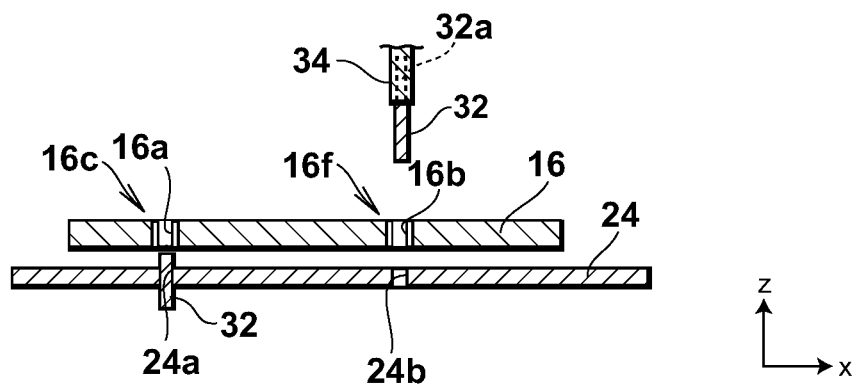

FIGS. 4A to 4C are process diagrams showing an operation of the replacement device in the friction stir welding apparatus according to the present embodiment. FIGS. 5A to 5C are also process diagrams showing an operation of the replacement device in the friction stir welding apparatus according to the present embodiment, and show steps subsequent to those shown in FIGS. 4A to 4C.

First, when the probe 32 is worn down or smeared after repeating a friction-stir welding step a predetermined number of times, the arm 54 of the robot 50 is moved to position the probe 32 of the welding tool 30 and the holder 34 with the probe 32 attached vertically above the gripping hole 16a of the gripping device 12, as shown in FIG. 4A. At this time, the support plate 24 of the holding device 20 is rotated to position an empty holding hole 24a, in which nothing is held, vertically below the gripping hole 16a, and also to position the holding hole 24b, in which a new probe 32 is held, vertically below the gripping hole 16b.

Next, as shown in FIG. 4B, the drive mechanism 38 of the welding tool 30 is driven to vertically lower the probe 32 and the holder 34 with the probe 32 attached. After the probe 32 passes through the gripping hole 16a, the holder 34 enters into the gripping hole 16a to be gripped by the gripping hole 16a. In this state, when a driving force for generating rotations in the counterclockwise direction is applied to the probe 32 from the drive mechanism 38 through the restricting portion 32a, the holder 34 is gripped by the gripping hole 16a, and is prohibited from rotating. Therefore, the restricting portion 32a weakens the restricted state of the probe 32 relative to the restricting portion 32a, while rotating in the counterclockwise direction. When such a restricted state is then weakened completely, a driving force from the drive mechanism 38 is not coupled to the probe 32. Thereafter, the probe 32 drops off the holder 34 vertically downward by its weight.

At this time, when the pressing member 26a of the pressing device 26 is advanced toward the probe 32 to press the probe 32, the probe 32 easily comes off the holder 34.

Next, as shown in FIG. 4C, the probe 32 drops vertically downward by its weight, and is caught by an empty holding hole 24a of the holding device 20, and held therein. Simultaneously, the drive mechanism 38 of the welding tool 30 is driven to remove the holder 34 with the probe 32 detached from the gripping hole 16a, and to raise the holder 34. At this time, when the restricting portion 32a is first rotated in the clockwise direction, and is then rotated in the counterclockwise direction to apply an impact force to the holder 34, the holder 34 is easily removed from the gripping hole 16a.

Next, as shown in FIG. 5A, the arm 54 of the robot 50 is moved to position the holder 34 with the probe 32 detached vertically above the gripping hole 16b of the gripping device 12. At this time, the holding hole 24b in which a new probe 32 is held is positioned vertically below the gripping hole 16b.

Next, as shown in FIG. 5B, the drive mechanism 38 of the welding tool 30 is driven to vertically lower the holder 34 with the probe 32 detached to enter the holder 34 into the gripping hole 16b to be gripped by the gripping hole 16b. Also, the probe 32 held in the holding hole 24b is accommodated inside of the holder 34, and is connected to the restricting portion 32a to enter a state where a driving force from the drive mechanism 38 is coupled to the probe 32. In this state, when a driving force for generating rotations in the clockwise direction is applied to the probe 32 through the restricting portion 32a, the holder 34 is gripped by the gripping hole 16b, and is prohibited from rotating. Therefore, the restricting portion 32a strengthens the restricted state of the probe 32 relative to the restricting portion 32a, while rotating in the clockwise direction. After such a restricted state is strengthened completely, a driving force from the drive mechanism 38 is shut off to completely attach the probe 32 to the holder 34 through the restricting portion 32a.

At this time, when the pressing member 26b of the pressing device 26 is advanced toward the probe 32 to press the probe 32, the probe 32 is reliably connected to the restricting portion 32a easily.

Next, as shown in FIG. 5C, the drive mechanism 38 of the welding tool 30 is driven to raise the holder 34 with the probe 32 attached, in order to be prepared for the next friction stir welding. At this time, when the restricting portion 32a is first rotated in the counterclockwise direction, and is then rotated in the clockwise direction to apply an impact force to the holder 34, the holder 34 is easily removed from the gripping hole 16b.

Furthermore, when the probe 32 is worn down and smeared after repeating the friction-stir welding step a predetermined number of times, the support plate 24 of the holding device 20 is rotated to position an empty holding hole 24a, in which nothing is held, vertically below the gripping hole 16a, and also to position the holding hole 24b, in which a new probe 32 is held, vertically below the gripping hole 16b, in order to repeat the above step of replacing the probe 32.

In the present invention, the shape, the arrangement, the number, and the like of the members are not limited to those in the embodiment explained above, and it is needless to mention that the constituent elements can be modified as appropriate without departing from the scope of the invention, such as appropriately replacing these elements by other ones having identical operational effects.

As described above, the present invention can provide a processing apparatus including a replacement device that can freely and automatically replace a plurality of processing members continuously in a manner of high-precision alignment between constituent components with a simple configuration in which the number of components is reduced. Therefore, because of its general purposes and universal characteristics, applications of the present invention are expected in a wide range in the field of machine processing such as friction stir welding of a strength member of a movable body such as an automobile.

What is claimed is:

1. A processing apparatus, comprising:
   a processing tool that includes a drive mechanism, a processing member that is vertically movable to a processing-target member and rotatable relative to the processing-target member by utilizing a driving force of the drive mechanism, and a holder that detachably holds the processing member through a restricting portion;
   a moving mechanism that includes an arm to which the processing tool is attached, and that can freely move the processing tool to the processing-target member by moving the arm; and
   a replacement device that can freely replace the processing member, wherein the replacement device comprises,
      a gripping device that includes a single first support member, the single first support member being immovably fixed relative to a floor, a first gripping portion that is immovably fixed relative to the floor and is provided on the first support member, and can freely grip the holder so as to prevent rotation of the holder in a loosening direction when the processing member is removed from the holder, and a second gripping portion that is immovably fixed relative to the floor and is provided on the first support member apart from the first gripping portion, and can freely grip the holder so as to prevent rotation of the holder in a fastening direction when the processing member is attached to the holder, the fastening direction being opposite to the loosening direction; and a holding device that includes a single movable second support member, a plurality of first holding portions that are provided on the second support member, and can freely and respectively accommodate the processing member removed from the holder, and a plurality of second holding portions that are provided on the second support member apart from the plurality of first holding portions, and can freely and respectively accommodate the processing member to be attached to the holder, wherein when the processing member is detached from the holder during replacement of the processing member, the second support member of the holding device is moved relative to the gripping device, thereby positioning the first support member of the gripping device to extend across both a corresponding one of the plurality of first holding portions and a corresponding one of the plurality of second holding portions, arranging the corresponding one of the plurality of first holding portions vertically below the first gripping portion, and arranging the corresponding one of the plurality of second holding portions vertically below the second gripping portion.

2. The processing apparatus according to claim 1, wherein the first gripping portion and the second gripping portion of the gripping device, and the processing-target member placed on a placement member are disposed within a movable range of the processing tool, the movable range of the processing tool being defined by movement of the arm by the moving mechanism.

3. The processing apparatus according to claim 1, wherein the processing apparatus is a friction stir welding apparatus, and the fastening direction is a rotation direction of the friction stir welding apparatus at a time of friction stir welding.

4. The processing apparatus according to claim 1,
wherein the second support member of the holding device is rotatable about a center axis thereof and is disk-shaped,
wherein the plurality of first holding portions are disposed on a first concentric circle to form a first circular line, the first concentric circle being disposed at a first radial distance from the center axis of the second support member,
wherein the plurality of second holding portions are disposed on a second concentric circle to form a second circular line, the second concentric circle being disposed at a second radial distance from the center axis of the second support member, the first and second radial distances being different, and
when the processing member is detached from the holder during replacement of the processing member, the second support member is rotated in a state where the first line is positioned vertically below the first gripping portion, and where the second line is positioned vertically below the second gripping portion, thereby feeding each of the plurality of first holding portions successively to be positioned vertically below the first gripping portion, and feeding each of the plurality of second holding portions successively to be positioned vertically below the second gripping portion.

5. The processing apparatus according to claim 4, wherein a straight line, connecting the first gripping portion and the second gripping portion, does not pass through a center axis of the second support member.

6. The processing apparatus according to claim 1, wherein each of the first gripping portion and the second gripping portion grips the holder according to an operation of a ratchet.

7. The processing apparatus according to claim 1, wherein the gripping device is elastically supported.

8. The processing apparatus according to claim 1, further comprising a pressing device that presses the processing member when the processing member is released from the holder, and that presses the processing member when the processing member is attached to the holder.

9. The processing apparatus according to claim 1, wherein the moving mechanism is an industrial robot.

10. The processing apparatus according to claim 1, wherein
the first gripping portion comprises a first hole formed on the first support member and a first ratchet disposed within the first hole, and
the second gripping portion comprises a second hole formed on the first support member and a second ratchet disposed within the second hole.

* * * * *